UNITED STATES PATENT OFFICE.

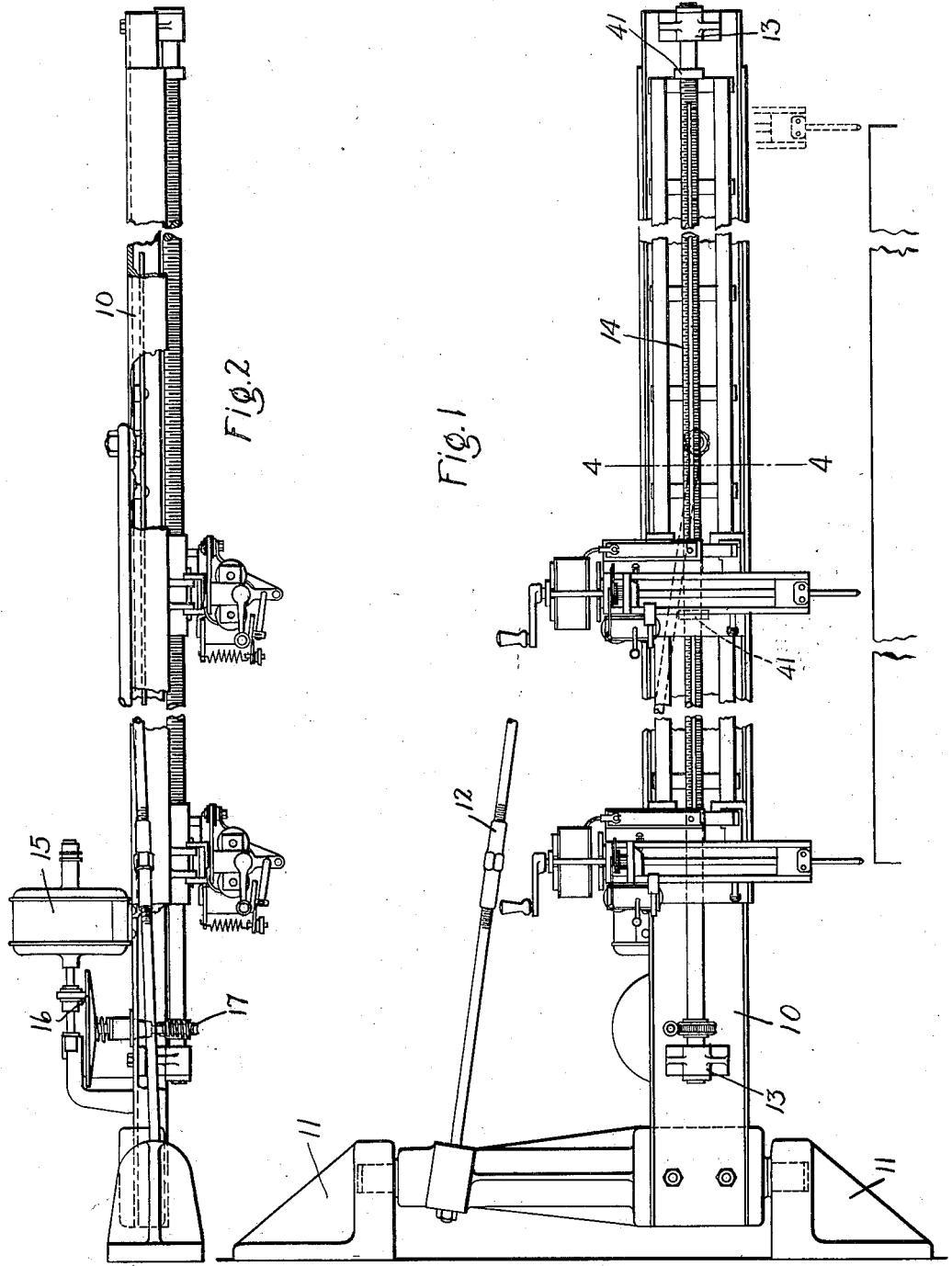

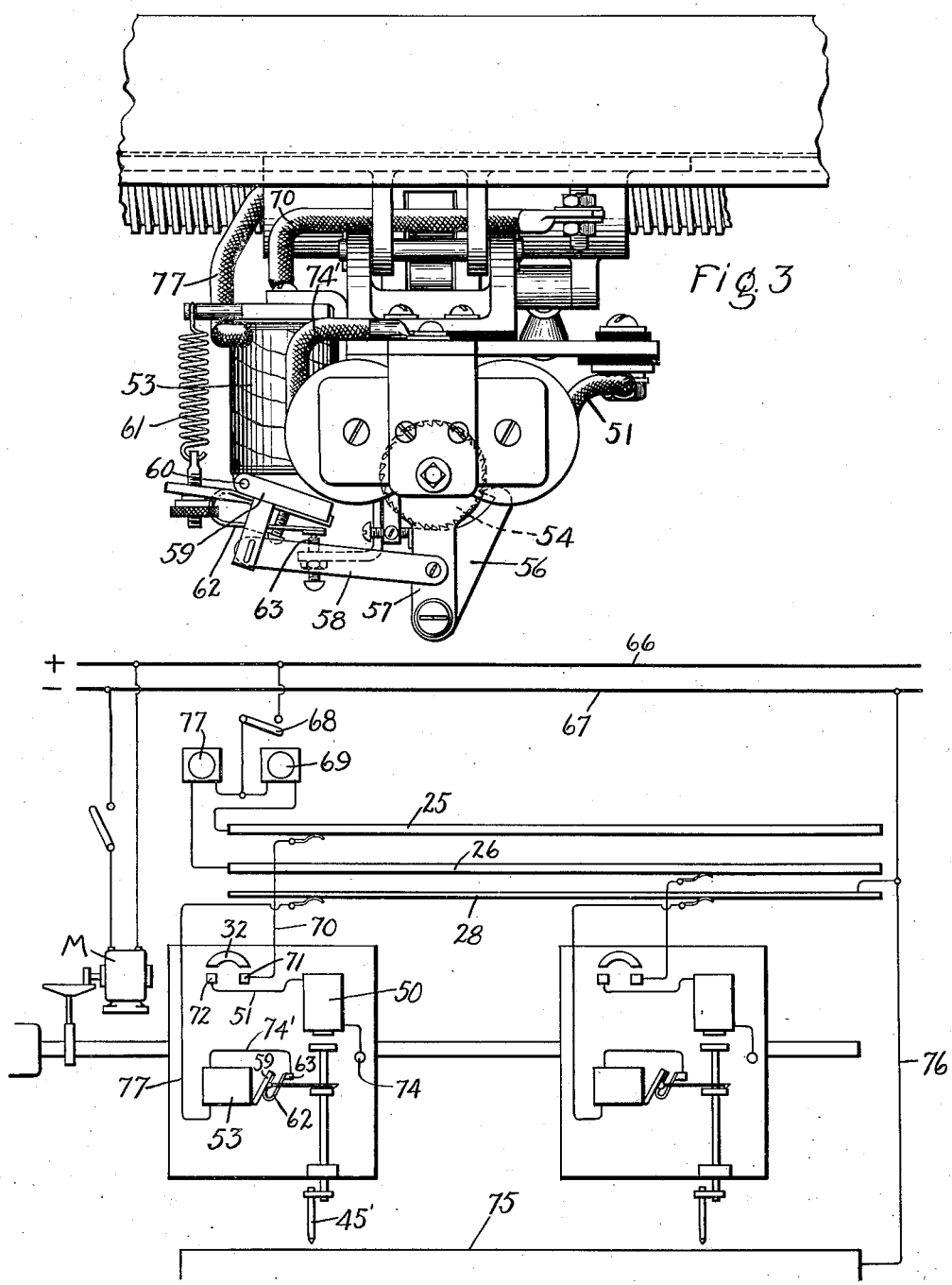

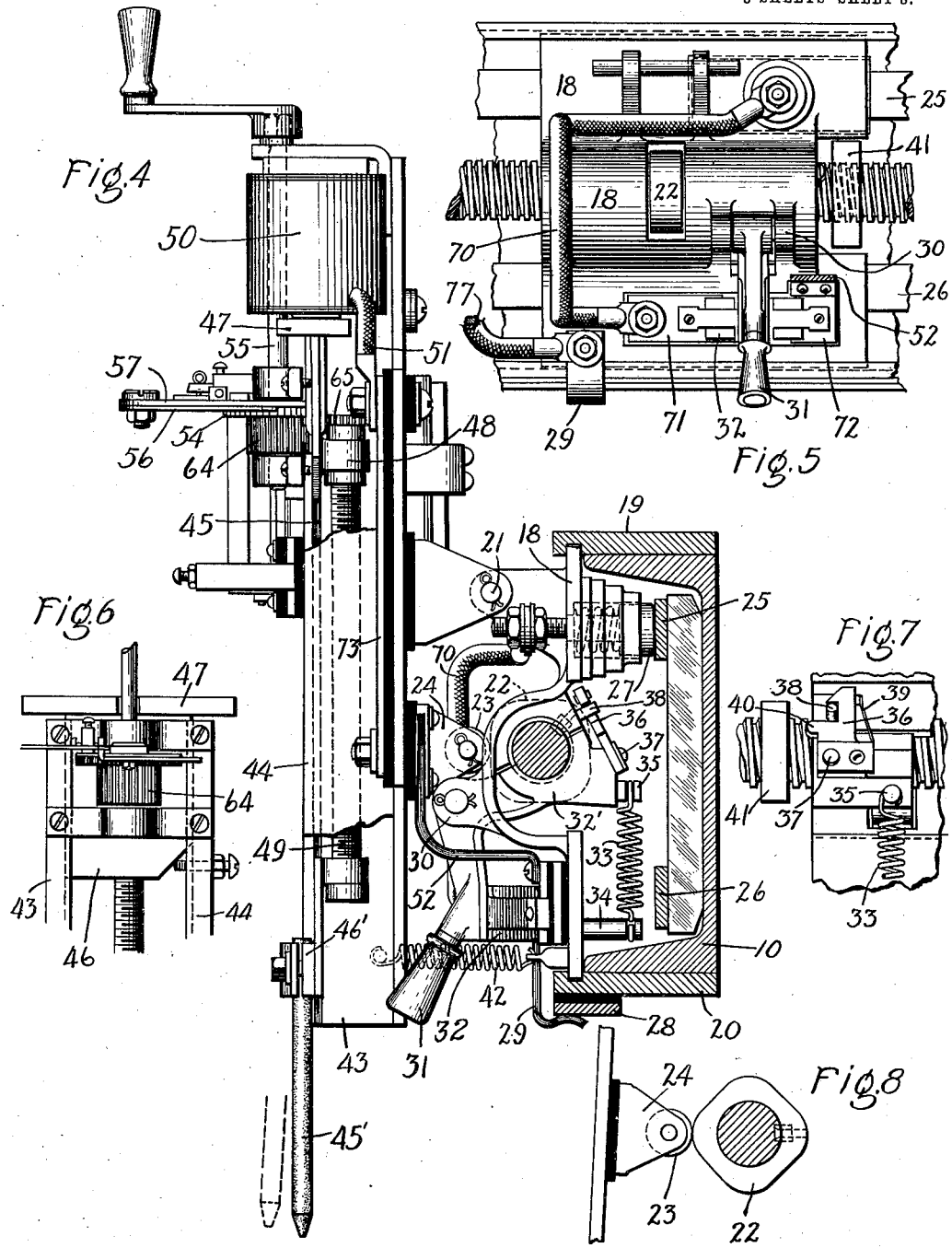

JOHN L. HALL AND AMANDUS METZGER, OF SCHENECTADY, NEW YORK, ASSIGNORS TO GENERAL ELECTRIC COMPANY, A CORPORATION OF NEW YORK.

ELECTRIC WELDING-MACHINE.

996,406.  Specification of Letters Patent.  Patented June 27, 1911.

Application filed April 1, 1907. Serial No. 365,677.

*To all whom it may concern:*

Be it known that we, JOHN L. HALL and AMANDUS METZGER, citizens of the United States, residing at Schenectady, county of Schenectady, State of New York, have invented certain new and useful Improvements in Electric Welding-Machines, of which the following is a specification.

This invention relates to electric welding machines, and has for its object the provision of means whereby an effective joint between metallic surfaces may be made in a simple and efficient manner.

While our invention is capable of a general application in the art of electric welding, and may be adapted for a variety of uses, it is particularly well fitted for the welding of seams and joints in which the surfaces to be joined have no great area but are distributed over considerable length. In the welding of tanks, receptacles and the like as well as in the manufacture of welded tubing, our invention will find a special application. In the welding of the seams of a tank, for instance, it is the practice at present to have this operation performed by hand. The tank is connected to one side of the line, and the operator passes over the joint with a carbon pencil connected with the other side of the line so as to form an electric arc along the line of welding. This process is extremely slow and costly.

In carrying out our invention, we provide one or more electric arcs arranged to travel back and forth across the article to be welded. The arc is formed by a carbon pencil connected with one side of the line while the work is connected to the other side. An arc is drawn between the pencil and the work, and means are provided whereby the carbon traverses the seam automatically and also moves transversely thereof to smooth out the welded surfaces.

Other objects of our invention will be made to appear in the course of the following specification in which we have shown one form of our invention.

Referring to the drawings, Figure 1 is a side elevation of a complete machine embodying our invention; Fig. 2 is a plan view of the same; Fig. 3 is an enlarged plan view of the traveling head and supporting guide; Fig. 4 is a sectional view taken on the line 4—4 of Fig. 1; Fig. 5 is an elevation of the traveling carriage with the welding head removed; Fig. 6 is a detail of the carbon feed mechanism; Fig. 7 a detail of the stopping device; Fig. 8 a detail of the cam and roller for giving the welding pencil a movement transversely of the seam; and Fig. 9 is a diagram of the circuit connections.

Referring to the drawings, 10 is a support for the welding heads and consists preferably of a channel bar pivotally supported at one end in the brackets 11 and having its opposite end supported by a tie rod 12. Mounted in the bearings 13 is a lead screw or spline rod 14 adapted to be rotated by means of an electric motor 15 through a friction drive 16 and worm gearing 17, the motor being preferably supported by the channel. A pair of carriages each embodying a welding head is adapted to be moved back and forth along the channel as a guide by means of the lead screw. Each carriage consists of a frame 18 having its upper and lower edges sliding in guides in the plates 19 and 20, secured respectively to the upper and lower sides of the channel 10. The welding head is pivoted to the carriage by means of a pin 21 passing through lugs on the carriage and head, and is adapted to be vibrated transversely of the line of travel by means of a cam 22 rotated by the lead screw and engaging a roller 23 mounted in the bracket 24 insulated from a welding head. The cam 22 is splined to the lead screw and is moved along by the carriage. As the carriage travels, a sliding contact is made with the contact strips 25 and 26, one for each carriage. Fig. 4 shows one of the carriages having a spring-pressed contact 27 engaging the contact strip 25, while the lower strip will be engaged by a similar contact on the other carriage, which latter contact is not shown. Another contact strip 28 is arranged along the bottom of the channel and insulated therefrom, which strip is engaged by laminated contacts 29 one on each carriage. Pivoted to the frame 18 at lugs 30 is a switch arm 31 for interrupting the circuit when the carriage reaches the limit of its movement. The particular construction of this switch forms no part of our invention although the form shown we have found to be very satisfactory. The switch is provided on one side of the pivot with a contact brush 32 and on the opposite side with a threaded socket forming a half nut 32′ which, by engaging the lead screw 14, drives the carriage. This switch is automatically opened by means of a spring 33, one end of which is secured to the carriage by a pin 34 and the other end secured to a lug 35 on the switch arm. The switch is normally held closed by a latch 36 pivoted at 37 to the switch arm and engaging a pin 38 on the frame. The latch is spring-pressed by means of a spring 39 and an extension 40 on the latch is adapted to be engaged by a collar 41 on the lead screw and to press the latch against the tension of the spring 39 out of engagement with the pin 38 to release the switch. This same movement unclutches nut 32′ from engagement with the lead screw and stops the carriage.

The welding head which is pivoted to the carriage at 21 and vibrated by means of the cam 22 is resiliently connected with the carriage by means of a spring 42. The head consists of a frame work composed of plates 43 and 44 grooved at 45 to receive the sliding plate 46, at the upper end of which is an armature 47. Secured to the plate 46 within the casing is a bearing nut 48 for a lead screw 49, to the lower end of which is secured a carbon pencil 45′ by means of a clamp 46′, so that the carbon will be moved up and down as the plate 46 is moved up and down in its guides by the armature 47. Armature 47 is controlled by an electromagnet 50, one terminal of which passes to the automatic switch through terminals 51 and 52, while the other end is grounded in the frame.

In order to feed the carbon pencil down as it gradually burns away, we provide a ratchet mechanism controlled by magnet 53. This mechanism consists of a ratchet wheel 54 secured to a shaft 55, and engaged by a pawl 56 pivoted to an arm 57 adapted to rotate on the shaft 55. A link 58 connects the arm 57 with a projection on the armature 59 pivoted at 60 to the magnet 53. A spring 61 normally holds the armature 59 away from the magnet, and the spring contactor 62 engages with a contact screw 63 to close the circuit of the magnet when the armature is away from the latter, as shown in Fig. 3. As the armature 59, which is grounded to the frame, is drawn up by the magnet the pawl 56 passes over the teeth of the ratchet until the circuit is broken at the screw 63. The spring 61 then pulls the armature back and the pawl 56 advancing the ratchet turns the shaft 55. Secured to the shaft 55 is a gear 64 having a broad face and adapted to engage a narrow faced gear 65 on the end of the screw 49. When the magnet 53 is energized sufficiently to attract its armature, the carbon pencil will be fed down through the ratchet mechanism above described. The shaft 55 is provided with a handle for adjusting the carbon pencil by hand, if desired.

The arrangement of circuits and the mode of operation of our device is as follows: The motor M is connected across the mains 66 and 67. When the switch 68 is closed, current passes from main 66 through switch 68, rheostat 69 to contact strip 25 thence through conductor 70 to contact plate 71 thence across the bridging contact 32 of the switch to plate 72 and terminal 52, conducting strip 73, conductor 51 to coil 50 and thence to the frame of the carriage at 74. The current then passes from the frame to the carbon pencil 45′ thence to the plates 75 to be welded and back to line through conductor 76. At the same time, current passes in a similar way through rheostat 77, contact strip 26 thence through the carriage and welding head on the right of Fig. 9, and back to the line through the metallic plates through conductor 76. At starting the contact brush 32 being latch-closed, the magnet 50 will be energized, lifting the carbon pencil 45′ and drawing an arc between the carbon and the plates 75 thereby developing a welding heat at the seam. The motor being started, the lead screw 14 is rotated, driving the carriages to the right from the positions shown in full lines in Figs. 1 and 9. As the carriages move, the carbon pencil follows along the seam to be welded, and at the same time the cam 22 causes the carbon to vibrate back and forth transversely of the seam, as shown in dotted lines in Fig. 4, thereby causing the metal to run together, and make a smooth joint. When the pencil 45′ becomes worn away so that the gap is too large and the arc is in danger of being disrupted, the drop of potential across the arc increases and the coil 53 which is connected in shunt to the arc is energized sufficiently to feed. The circuit of this coil 53 is closed from contact strip 28 and brush 29 through conductor 77 to coil 53 thence through conductor 74′, contact screw or stud 63 thence across the spring contact 62 to armature 59 which is grounded to the frame. The carbon will therefore be fed down automatically as it wears away. The carriages will pass along, automatically welding the seam until the end of the travel is reached, at which point they will be automatically stopped and the circuit interrupted. In Fig. 1, this stopping and interrupting of the circuit of both welding heads is produced by the collars 41, one of which is arranged at the end of the lead screw to be engaged by the carriage when the latter reaches the position shown in dotted lines, while the other one is arranged at or about the middle of the screw. If desired, the motor may then be reversed and either the work or the support 10 shifted to another seam so that the welding may be performed on a return movement.

It will be understood, of course, that while we have, in accordance with the patent statutes, shown and described specific apparatus for carrying out our invention, it is in no sense limited either as to the construction or application to what we have described, since various changes and modifications as well as other applications will suggest themselves to those skilled in the art, all of which will come within the spirit of our invention in so far as they are within the scope of the claims annexed hereto.

What we claim as new and desire to secure by Letters Patent of the United States, is,—

1. An electric welding machine comprising means for producing an electric arc at the junction of the metals to be welded, mechanism whereby said arc is automatically moved over said junction and automatic feeding means for preventing interruption of the arc.

2. An electric welding machine comprising means for producing an electric arc at the junction line of metallic plates to be welded, mechanism whereby the arc is automatically moved along said line to form a welded joint and electromagnetic feeding means for preventing interruption of the arc.

3. An electric welding machine comprising means for producing an electric arc at the junction line of the metallic plates to be welded, mechanism for moving the arc along said line to form a welded joint, and a device for automatically stopping the arc at a predetermined point and simultaneously interrupting the same.

4. An electric welding machine comprising an electrode connected to one side of an electric circuit and arranged in proximity to the junction of metals to be welded, electrical connections between said metals and the opposite side of the circuit, mechanism for automatically moving the electrode over the junction to form a welded joint and electromagnetic feeding means for preventing interruption of the arc.

5. An electric welding machine comprising an electrode connected to one side of an electric circuit and arranged in proximity to the junction line of the metals to be welded, electrical connections between said metals and the opposite side of the circuit, mechanism for automatically moving the electrode along the junction line and transversely thereof to form a welded joint and electromagnetic feeding means for preventing interruption of the arc.

6. An electric welding machine comprising an electrode connected to one side of an electric circuit and arranged in proximity to the junction line of the metals to be welded to form an arc, electrical connections between said metals and the opposite side of the circuit, means for automatically feeding the electrode to the metals without interrupting the arc, and mechanism for automatically moving the electrode along the junction line to form a welded joint.

7. An electric welding machine comprising an electrode connected to one side of an electric circuit and arranged in proximity to the junction line of the metals to be welded to form an arc, electrical connections between said metals and the opposite side of the circuit, means for automatically feeding the electrode to the metals without interrupting the arc, and mechanism for automatically moving the electrode along the junction line and transversely thereof to form a welded joint.

8. An electric welding machine comprising a plurality of electrodes connected to one side of an electric circuit and arranged in proximity to the junction of metals to be welded, electrical connections between said metals and the opposite side of the circuit, mechanism for automatically moving the electrodes along the junction line to form a welded joint and electromagnetic means for positively feeding the electrodes to the metals.

9. An electric welding machine comprising a plurality of electrodes connected to one side of an electric circuit and arranged in proximity to the junction of metals to be welded to form arcs, electrical connections between said metals and the opposite side of the circuit, means for automatically feeding said electrodes to the metals without interrupting the arcs, and mechanism for automatically moving the electrodes along the junction line to form a welded joint.

10. An electric welding machine comprising a plurality of electrodes connected to one side of an electric circuit and arranged in proximity to the junction line of metals to be welded to form arcs, electrical connections between said metals and the opposite side of the circuit, means for automatically feeding said electrodes to the metals without interrupting the arcs, and mechanism for automatically moving the elctrodes along the junction line and transversely thereof to form a welded joint.

11. An electric welding machine comprising a plurality of pivotally mounted spaced electrodes connected to one side of an electric circuit and arranged in proximity to the junction line of the metals to be welded, fixed electrical connections between said metals and the opposite side of the circuit, and mechanism for automatically moving the electrodes at a fixed distance apart along the junction line to form a welded joint.

12. An electric welding machine comprising a plurality of spaced electrodes connected to one side of an electric circuit and arranged in proximity to the junction line of the metals to be welded, electrical connections between said metals and the opposite side of the circuit, and mechanism for automatically moving the electrodes at a fixed distance apart along the junction line and transversely thereof to form a welded joint.

13. An electrical welding machine comprising a welding electrode and means for connecting the same to one side of an electric circuit, a support for said electrode, mechanism for moving the electrode along the support, means for reciprocating the same at an angle to its line of movement and electromagnetic means for positively feeding the electrode to prevent interruption of the arc.

14. An electric welding machine comprising a pivotally mounted electrode and means for connecting the same to one side of an electric circuit, a support therefor, mechanism for moving the electrode along the support, means for giving the electrode an additional movement at an angle to its line of travel and electromagnetic means for positively feeding the electrode to prevent interruption of the arc.

15. An electric welding machine comprising a plurality of pivotally mounted electrodes and means for connecting the same to one side of an electric circuit, a support therefor, mechanism for moving said electrodes along said support at a fixed distance apart, and means for reciprocating the electrodes on the pivots.

16. An electric welding machine comprising an electrode and means for connecting the same to one side of an electric circuit, a support for said electrode, mechanism for moving the electrode along the support, means for giving the electrode an additional movement at an angle to its line of travel, and a device for stopping the movement of the electrode and simultaneously opening the circuit thereof at a predetermined point.

17. An electric welding machine comprising a welding electrode and means for connecting the same to one side of an electric circuit, a support therefor, an electromagnetic device for positively feeding said electrode, mechanism for moving the electrode along the support, and means for reciprocating the same at an angle to its line of movement.

18. An electric welding machine comprising a welding head provided with an electrode, means for connecting the same to one side of an electric circuit, a support therefor, a lead screw engaging said head for moving the same along said support, and means for moving the electrode at an angle to the direction of movement imparted by the screw.

19. An electric welding machine comprising a pivotally mounted head provided with an electrode, means for connecting the same to one side of an electric circuit, a support therefor, a lead screw engaging the head for moving the same along the support, and an element driven by said lead screw for engaging the head and rocking the same on its pivot.

20. An electric welding machine comprising a welding head provided with an electrode, a support therefor, mechanism for moving the electrode along the support, means for reciprocating said electrode at an angle to its line of movement, an electrical contact arranged longitudinally of said support, and a contactor electrically connected to said electrode and arranged to movably engage the contact.

21. An electric welding machine comprising a plurality of pivotally mounted spaced welding heads, each provided with an electrode and electrical connections between said electrodes and one side of an electric circuit, a support for said heads, a lead screw engaging the heads for moving the same along the support at a fixed distance apart, and an element driven by the lead screw for engaging the heads and rocking the same on their pivots.

22. An electric welding machine comprising a plurality of pivotally mounted permanently spaced welding heads, each provided with an electrode and electrical connections between said electrodes on one side of an electric circuit, automatic feeding devices for said electrodes, a support for said heads, a lead screw engaging the heads for moving the same along the support at a fixed distance apart, and an element driven by the lead screw engaging the heads and rocking the same on their pivots.

23. An electric welding machine comprising a plurality of pivotally mounted welding heads, each provided with an electrode, electrical connections between said electrodes and one side of an electric circuit, a support for said heads, a lead screw engaging the heads for moving the same along the support, an element driven by the lead screw for engaging the heads and rocking the same on their pivots, and means for automatically stopping the heads and simultaneously interrupting the electric circuit at a predetermined point.

24. An electric welding machine comprising a plurality of pivotally mounted welding heads each provided with an electrode, automatic feeding devices for said electrodes, electrical connections between said electrodes and one side of an electric circuit, a support for said heads, a lead screw engaging the heads for moving the same along the support, an element driven by the lead screw for engaging the heads and rocking the same on their pivots, and means for automatically stopping the heads and simultaneously interrupting the electric circuit at a predetermined point.

25. An electric welding machine comprising an electrode connected to one side of an electric circuit and arranged in proximity to the junction of the metals to be welded, electrical connections between said metals and the opposite side of the circuit, mechanism for automatically moving the electrode along the junction line and electromagnetic means for positively feeding the electrode to the metals.

26. An electric welding machine comprising a pivotally mounted head provided with an electrode, means for connecting the same to one side of an electric circuit, a support for the head, means engaging the head for moving the same along the support and means for rocking the head on its pivot.

27. An electric welding machine, including a pivotally mounted head provided with an electrode, means for connecting the same to one side of an electric circuit, a support for the head and means for rocking the head on its pivot.

28. An electric welding machine including a support, a head pivoted to the support, an electrode and electrode feeding means supported on the head.

29. An electric welding machine including a support, a head pivoted to the support, an electrode and electrode feeding means supported on the head, and means for moving the head along the support.

30. An electric welding machine including a support, a head pivoted to the support, an electrode and electrode feeding means supported on the head, and means for moving the head along the support and transversely thereto.

31. An electric welding machine, including a support, a head pivoted to the support, an electrode and electrode feeding means supported on the head and means for moving the head transversely to the support.

In witness whereof, we have hereunto set our hands this 30th day of March, 1907.

JOHN L. HALL.
AMANDUS METZGER.

Witnesses:
BENJAMIN B. HULL,
HELEN ORFORD.